United States Patent
Edwards et al.

(10) Patent No.: US 10,594,492 B1
(45) Date of Patent: Mar. 17, 2020

(54) AUTHENTICATING A PRINTED CIRCUIT BOARD

(71) Applicant: National Technology & Engineering Solutions of Sandia, LLC, Albuquerque, NM (US)

(72) Inventors: Nathan J. Edwards, Colorado Springs, CO (US); Jason Hamlet, Albuquerque, NM (US); Mitchell Tyler Martin, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 266 days.

(21) Appl. No.: 15/624,907

(22) Filed: Jun. 16, 2017

Related U.S. Application Data (60) Provisional application No. 62/351,763, filed on Jun. 17, 2016.

(51) Int. Cl.
| | |
|---|---|
| *G06F 21/00* | (2013.01) |
| *H04L 29/06* | (2006.01) |
| *H04L 9/32* | (2006.01) |
| *G06F 21/72* | (2013.01) |
| *G06F 21/78* | (2013.01) |

(52) U.S. Cl.
CPC .......... *H04L 9/3247* (2013.01); *H04L 9/3278* (2013.01)

(58) Field of Classification Search
CPC ............................. H04L 9/3247; H04L 9/3278
See application file for complete search history.

(56) References Cited

U.S. PATENT DOCUMENTS

| | | | |
|---|---|---|---|
| 8,379,856 | B2 | 2/2013 | Potkonjak |
| 8,700,916 | B2 | 4/2014 | Bell et al. |
| 8,848,905 | B1 | 9/2014 | Hamlet et al. |
| 9,048,834 | B2 | 6/2015 | Li et al. |
| 9,189,654 | B2 | 11/2015 | Feng et al. |

(Continued)

FOREIGN PATENT DOCUMENTS

EP    3340213 A1 *  6/2018    ......... G06Q 30/0185

OTHER PUBLICATIONS

Yansong Gao ; Hua Ma ; Derek Abbott ; Said F. Al-Sarawi; "PUF Sensor: Exploiting PUF Unreliability for Secure Wireless Sensing"; IEEE Transactions on Circuits and Systems; Sep. 2017; vol. 64, Issue 9; Journal Article; Publisher: IEEE; pp. 2532-2543 (Year: 2017).*

(Continued)

*Primary Examiner* — Kendall Dolly
*Assistant Examiner* — Courtney D Fields
(74) *Attorney, Agent, or Firm* — Samantha Updegraff; Madelynne J. Farber; Mark A. Dodd (57) ABSTRACT

A computing module is described herein, wherein the computing module is configured to perform acts including generating a digital signature for a printed circuit board (PCB), wherein the digital signature is based upon a sensor signal generated by a sensor that is electrically coupled to at least one of a trace of the PCB or an electrical component of the PCB. The acts further include determining that the PCB is authentic and is free of tampering based upon the digital signature. The acts additionally include outputting an indication that the PCB is authentic and is free of tampering responsive to determining that the PCB is authentic and is free of tampering.

17 Claims, 9 Drawing Sheets

(56) References Cited

U.S. PATENT DOCUMENTS

| | | |
|---|---|---|
| 2010/0293384 A1 | 11/2010 | Potkonjak |
| 2010/0293612 A1 | 11/2010 | Potkonjak |
| 2011/0002461 A1* | 1/2011 | Erhart .................... H04L 9/302 380/44 |
| 2013/0019324 A1* | 1/2013 | Tehranipoor ......... H03K 3/0315 726/34 |
| 2014/0108786 A1* | 4/2014 | Kreft ...................... G06F 21/71 713/156 |

OTHER PUBLICATIONS

Wei, et al., "BoardPUF: Physical Unclonable Functions for Printed Circuit Board Authentication", In 2015 IEEE/ACM International Conference on Computer-Aided Design (ICCAD), 2015, pp. 152-158.

Zhang, et al., "Robust Counterfeit PCB Detection Exploiting Intrinsic Trace Impedance Variations", In 2015 IEEE 33rd VLSI Test Symposium (VTS), 2015, 6 Pages.

* cited by examiner

AUTHENTICATING A PRINTED CIRCUIT BOARD

RELATED APPLICATION

This application claims priority to United States Provision Patent Application No. 62/351,763, filed on Jun. 17, 2016, the entirety of which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

A printed circuit board (PCB) is a board that includes semiconductor chips, electrical components (e.g., resistors, capacitors, etc.), and wire traces that electrically couple componentry of the PCB. Given their low cost and high flexibility, PCBs are a basic component of modern electronic devices. As such, PCBs (or discrete electrical components included in PCBs) may be the target of counterfeit attempts and/or tampering. An electronic device comprising a counterfeit PCB (or a counterfeit electrical component) in place of the intended PCB (or the intended electrical component) can have financial, legal, and safety consequences. For example, a counterfeit PCB may not meet certain safety standards imposed by regulations, may include inferior components, etc. As a result, an electronic device having a counterfeit (or tampered with) PCB may not perform as intended.

SUMMARY

The following is a brief summary of subject matter that is described in greater detail herein. This summary is not intended to be limiting as to the scope of the claims.

Described herein are various technologies pertaining to authenticating printed circuit boards (PCBs). More specifically, generation of a digital signature that uniquely identifies a PCB is described herein, wherein the digital signature is reproducible. The digital signature is generated based upon measurements pertaining to wire traces of the PCB as signals having predefined waveforms are propagated through such traces. Additionally or alternatively, the digital signature is generated based upon values of discrete components on the PCB, such as resistors, capacitors, inductors, etc., where a sensor (e.g., a multimeter) can read values of such components. With more particularity, an energy source (e.g., a waveform generator) generates a signal having a predefined waveform, and the signal is directed through one or more traces of the PCB. For instance, the waveform generator can generate a signal having a square-wave waveform, and such signal can be provided as input at a first point (near a first end) on a wire trace. A sensor (e.g., an oscilloscope) coupled to the wire trace can generate a sensor signal, wherein the sensor signal represents the signal at a second point (near a second end) on the wire trace. Properties of the wire trace impact the signal as the signal passes through the wire trace. Moreover, a sensor (e.g., a meter) can be configured to output values that are indicative of an electrical characteristic of electrical componentry on the PCB (e.g., impedance), and the digital signature can be generated based upon such values (as described herein).

A computing component receives the sensor signal and/or sensor values and generates a digital signature based upon properties of the sensor signal and/or a value of the sensor value, wherein the digital signature uniquely identifies the wire trace and/or the electrical componentry, and thus uniquely identifies the PCB. In an example, the digital signature is generated at a time when the PCB is known to be authentic and not tampered with (which can be referred to herein as Enrollment); accordingly, this digital signature can be labeled as a verified digital signature, and can subsequently be utilized to ensure that a PCB (presented as being the PCB) is, in actuality, the PCB, and to further ensure that the PCB has not been subject to tampering. The verified digital signature may be stored on the PCB itself, or in a data store accessible to a computing device. More specifically, when it is desirable to authenticate the PCB, a test digital signature can be generated (which can be referred to herein as Regeneration) using the process described above (using the same waveform used to generate the verified digital signature). The test digital signature can be compared with the verified digital signature, and a determination is made as to whether or not the PCB is authentic (and has not been subject to tampering) based upon such comparison. The test digital signature can be compared to the verified digital signature with a computing module on the PCB itself, or the test digital signature can be transmitted to the computing device, wherein the computing device can compare the test digital signature to the verified digital signature stored in the data store. The computing device can then output an indication as to whether or not the PCB is authentic and/or has been subject to tampering. While the digital signature has been described above as being generated based upon a sensor signal with respect to one component of the PCB, it is to be understood that the digital signature can be generated based upon multiple sensor signals with respect to multiple components of the PCB.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to authenticating a printed circuit board (PCB) based upon a digital signature for the PCB are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "module" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Figure 1:
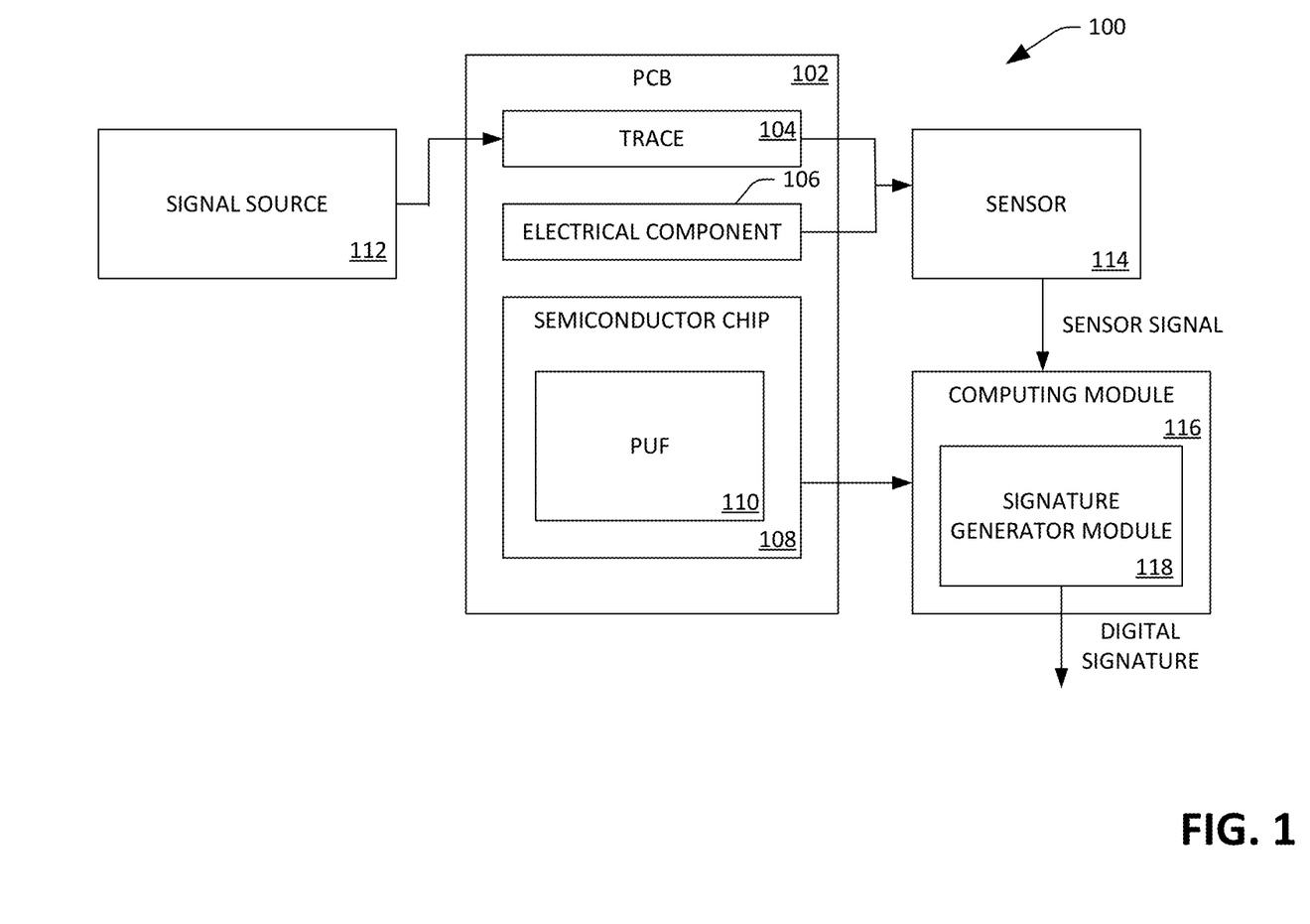
FIG. 1 is a diagram of an exemplary system that facilitates constructing a digital signature for a printed circuit board (PCB).

With reference to FIG. 1, an exemplary system 100 that is configured to generate a digital signature that uniquely identifies a printed circuit board (PCB) is illustrated. The digital signature can be utilized for a variety of purposes: 1) to ensure that a counterfeit PCB is not provided in place of the PCB; 2) to ensure that the PCB has not been subject to tampering; and/or 3) as a cryptographic key (or used to generate a cryptographic key).

The system 100 includes a PCB 102, wherein the PCB 102 comprises a trace 104, an electrical component 106 (such as a resistor, a capacitor, an inductor, a diode, a transformer, or similar passive electrical component), and a semiconductor chip 108. The trace 104, the electrical component 106, and the semiconductor chip 108 are depicted in functional block diagram form for ease of explanation; it is to be understood, however, that the trace 104, the electrical component 106, and the semiconductor chip 108 may be electrically coupled to one another on the PCB 102, and the PCB 102 may include numerous traces, electrical components, and/or semiconductor chips. The semiconductor chip 108 optionally comprises a physical unclonable function (PUF) 110.

The system 100 further comprises a signal source 112 that is electrically coupled to at least one of the trace 104 or the electrical component 106. The signal source 112, in an example, can be or include a waveform generator, although other types of signal sources are contemplated. The signal source 112, in an exemplary embodiment, is an analog signal source that generates signals having waveforms, such as square waves, sawtooth, etc., and further wherein the signal source 112 can generate the signals having the waveforms with known frequencies. While the signal source 112 is illustrated in FIG. 1 as being external to the PCB 102, it is to be understood that the signal source 112 may be on the PCB 102 (e.g., in the form of an integrated circuit placed on the PCB 102).

The system 100 further comprises a sensor 114 that is electrically coupled to the at least one of the trace 104 or the electrical component 106, wherein the sensor 114 is configured to output a sensor signal that is indicative of an electrical parameter of the at least one of the trace 104 or the electrical component 106 as the signal source 112 generates a signal. In an example, the signal source 112 is coupled to a first end of the trace 104, and generates a voltage signal having a predefined waveform and frequency. The sensor 114 can be electrically coupled to the trace 104 such that the sensor 114 outputs a (analog) sensor signal that is representative of voltage drop across the trace 104, rise time in the sensor signal, overshoot in the sensor signal, amongst other parameters. In another example, the signal source 112 is coupled to a first terminal of the electrical component 106 (e.g., a resistor), and generates a signal having a predefined waveform and frequency. The sensor 114 can be electrically coupled to terminals of the electrical component 106 such that the sensor 114 outputs a (analog) sensor signal that is representative of the impedance of the electrical component 106. While the system 100 is illustrated as including a single sensor 114, it is to be understood that the system 100 can include multiple sensors that are coupled to the trace 104, the electrical component 106, and/or the semiconductor chip 108. Further, more than one sensor can be electrically coupled to any of the trace 104, the electrical component 106, and/or the semiconductor chip 108. For instance, a first sensor can output a sensor signal that is representative of voltage drop across the trace 104, and a second sensor can output a sensor signal that is representative of impedance of the trace. In addition, the sensor 114 is illustrated as being external to the PCB 102; it is to be understood, however, that the sensor 114 may be positioned on the PCB 102.

The system 100 additionally includes a computing module 116 that is electrically coupled to the sensor 114 and/or the chip 108 (and thus the PUF 110), such that the computing module 116 can receive sensor signals output by the sensor 114 and/or output of the PUF 110. While the computing module 116 is illustrated as being external to the PCB 102, it is contemplated that the computing module 116 can be placed on the PCB 102. In a non-limiting example, the computing module 116, when placed on the PCB 102, can be integrated in the semiconductor chip 108 (thus output of the PUF 110 need not be exposed outside of the semiconductor chip 108).

The computing module 116 includes a signature generator module 118 that is configured to generate a digital signature for the PCB 102 based upon sensor signals output by the sensor 114 and/or output of the PUF 110. As indicated previously, the digital signature generated by the signature generator module 118 can uniquely identify the PCB 102, and can also be reproducible. In other words, the signature generator module 118 generates the digital signature based upon sensor signals output by the sensor 114, wherein the sensor signals are in turn based upon: 1) the signal (having the specified waveform and frequency) generated by the signal source 112; and 2) unique, inherent properties of the trace 104 and/or the electrical component 106. Additionally, when the PCB 102 includes the PUF 110, the signal generator module 118 can optionally generate the digital signature based upon output of the PUF 110. Accordingly, as the signal source 112 can repeatedly generate signals having predefined waveforms and frequencies, the signal generator module 118 can reproduce the same (or substantially similar) digital signature for the PCB 102. Additionally, in an embodiment, the computing module 116 can be a mobile computing device and can include the signal source 112 and the sensor 114. In this embodiment, the mobile computing device can perform the steps of generating the signal with the signal source 112, detecting the signal with the sensor 114, and converting the signal to a digital signature with the signal generator module 118. Various techniques employed by the signature generator module 118 to generate the digital signature for the PCB 102 based upon sensor signal(s) output by the sensor 114 will be described in greater detail below.

Exemplary operation of the system 100 is now set forth. At a time when authenticity of the PCB 102 is known (e.g., shortly after manufacture, after the PCB 102 has been tested, etc.), the signal source 112 is caused to emit a signal having a known, predefined waveform and frequency, such that the trace 104 receives the signal (or a derivative thereof). For example, the signal may be a sine wave, a square wave, a triangle wave, a sawtooth wave, etc. The sensor 114 is coupled to the at least one of the trace 104 or the electrical component 106, and generates at least one sensor signal (where, with respect to the trace 104, the sensor signal is based upon the signal emitted by the signal source 112). The at least one sensor signal is indicative of an electrical parameter of at least one of the trace 104 or the electrical component 106. In a non-limiting example, the electrical parameter may be a high voltage level, a low voltage level, an overshoot, an undershoot, a rise time, a fall time, impedance, skew, etc. evidenced in the sensor signal.

The computing module 116 receives the at least one sensor signal, and the signature generator module 118 constructs a verified digital signature for the PCB 102 based upon the at least one sensor signal. In an embodiment, the signature generator module 118, when constructing the digital signature, compares a value of a parameter (e.g., high voltage level, low voltage level, etc.) in the sensor signal with a corresponding value that is based upon at least one reference sensor signal (where the at least one reference signal is generated in a similar manner as described above). For example, the parameter can be a rise time in the sensor signal when the signal source 112 generated a source signal having a certain waveform and frequency. The corresponding value based upon the at least one reference signal may be a rise time in the at least one reference signal, may be an average rise time in several reference signals (generated from different PCB traces or components on the PCB 102 or on other PCBs), may be a mean rise time in the several reference signals, and so forth.

The signature generator module 118 generates the digital signature based upon comparisons between several values of several parameters of several sensor signals with corresponding reference parameter values of the at least one reference signal. In an embodiment, the signature generator module 118 can generate a '1' parameter value of the sensor signal is greater than or equal to the corresponding reference parameter value and a '0' bit otherwise. As noted above, the signature generator module 118 performs comparisons of several parameters values of sensor signals output by the sensor 114 with corresponding reference parameter values, so as to generate a plurality of bit values (with each bit value representing a result of a comparison), wherein the signature generator module appends these bit values to one another in a predefined order. The signature generator module 118 can generate the digital signature based upon the sequence of bits. Further, the signature generator module 118 can append output of the PUF 110 (or values derived based upon output of the PUF 110) to the sequence of bits, and the signal generator module can generate the digital signature based upon the resultant sequence of bits. It can therefore be ascertained that bits in the digital signature can be indicative of a property of a trace, one or more electrical components, etc., when the signal source 112 emits a signal having a predefined waveform and frequency, wherein such property is unique to the trace, electrical components, etc. Therefore, the verified digital signature generated by the signature generator module 118 can serve as a unique identifier for the PCB 102.

In an embodiment, the signature generator module 118 can perform suitable processing on the above-described sequence of bits (which may or may not include bits based upon output of the PUF 110) when generating the digital signature. For instance, such processing can be undertaken to increase the length of the digital signature (e.g., so as to increase the likelihood that the digital signature is unique). For example, for a signature that is n bits long, the signature generator module 118 can divide the digital signature into two sets of size (n/2), and perform an XOR operation with each bit of the first set to each bit of the second set. The signature generator module 118 can concatenate the resultant bits to one another, resulting in a digital signature that is $(n/2)^2$ bits long. Other processing is also contemplated.

The signature generator module 118 then causes the verified digital signature to be stored in (secure) computer-readable storage, where the digital signature can be indexed by an identifier for the PCB 102 (e.g., an item number assigned to the PCB 102 by its manufacturer). Additionally or alternatively, the signature generator module 118 uses the above-described sequence of bits to generate an asymmetric key pair (a public key and a private key). The public key can be stored in computer-readable storage on the PCB 102 itself or in another location. The private key need not be stored in memory at all; instead, when the authenticity of the PCB 102 needs to be determined, the signature generator module 118 can regenerate the private key using the aforementioned processes for generating the sequence of bits. Accordingly, in this example, the private key can act as the verified digital signature.

Subsequently, it may be desirable to authenticate that the PCB 102 is the same PCB that is identified by the verified digital signature. To that end, the signal source 112 (or another signal source that is capable of generating signals with defined waveforms and frequencies), if necessary, is coupled to the trace 104, and is caused to generate signals having the same waveforms and frequencies as the signals used to generate the verified digital signature. Further, as indicated above, the sensor 114 can be coupled to the electrical component 106, and output a sensor value that can be employed to construct a verified digital signature. Thus, the sensor 114 (or another sensor that senses the same electrical parameters as the sensor 114), if necessary, is coupled to at least one of the trace 104 or the electrical component 106, and outputs sensor signals (where a sensor signal with respect to the trace 104 are based upon the signal output by the signal source 112, and the sensor signal with respect to the electrical component is indicative of a property of the electrical component, such as resistance, capacitance, impedance, etc.). The computing module 116 (or some other computing module that is configured like the computing module 116) receives the sensor signals, and the signal generator module 118 generates a test digital signature based upon such sensor signals. It is to be noted that the signature generator module 118 uses the same approach to generate the test digital signature as was used to generate the verified digital signature; therefore, if the PCB presented for authentication is the same PCB identified by the verified digital signature, the test digital signature will be the same as the verified digital signature (or substantially similar to the verified digital signature).

The computing module 116 receives the identifier for the PCB 102, and retrieves the verified digital signature from computer-readable storage based upon such identifier. The computing module 116 compares the test digital signature with the verified digital signature. In an embodiment, the test digital signature and the verified digital signature are bit strings, and the computing module 116 compares each bit in the test digital signature to a bit in a corresponding position in the verified digital signature. Since the verified digital signature is unique to the PCB 102, if the two digital signatures are identical (or within some threshold similarity), the computing module 116 outputs an indication that the PCB 102 is authenticated (i.e., the PCB 102 is not a counterfeit and has not been subject to tampering). If, however, the test digital signature and the verified digital signature are not identical (or within some threshold similarity), the computing module 116 outputs an indication that the PCB 102 is counterfeit or has been subject to tampering.

Figure 2:
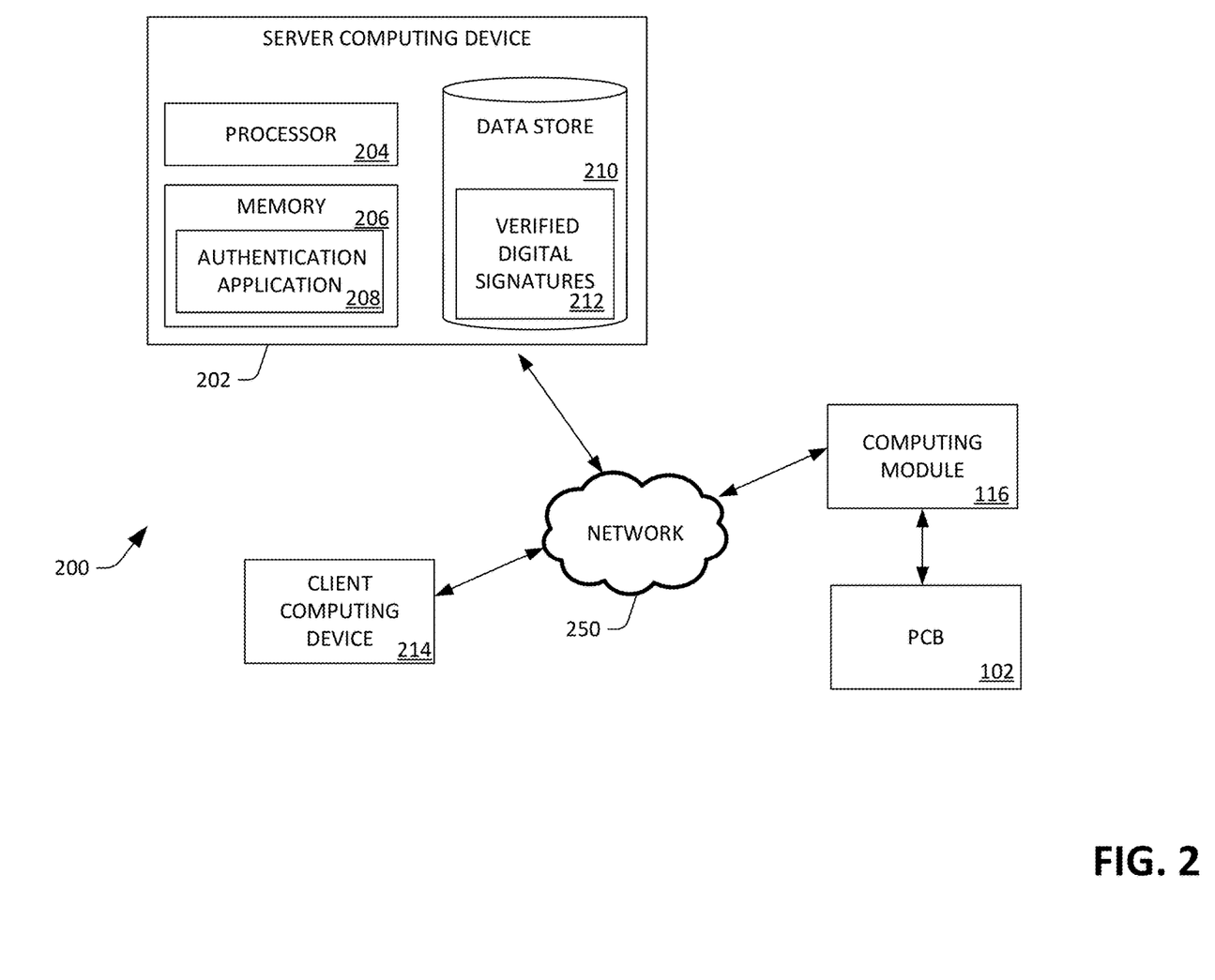
FIG. 2 is a block diagram of an exemplary computing system that can be authenticate a PCB.

With reference to FIG. 2, a computing system 200 that facilitates authenticating a PCB is illustrated. The computing system 200 includes a server computing device 202. The server computing device 202 comprises a processor 204 and memory 206, wherein the memory 206 has an authentication application 208 loaded therein. In general, the authentication application 208 is configured to compare a test digital signature for a PCB to a verified digital signature of the PCB. When the test digital signature is identical (or within some threshold similarity) to the verified digital signature, the authentication application 208 can output an indication that the test digital signature conforms to the verified digital signature and as a result, the PCB is authenticated. When the test digital signature is not identical (or not within some threshold similarity) to the verified digital signature, the authentication application 208 can output an indication that the test digital signature does not conform to the verified digital signature and as a result, the PCB is not authenticated.

The server computing device 202 further comprises a data store 210. The data stored contains a plurality of verified digital signatures 212 for a plurality of PCBs. Each verified digital signature in the plurality of verified digital signatures 212 can correspond to a particular PCB in the plurality of PCBs. In an embodiment, each verified digital signature in the plurality of digital signatures 212 can be indexed by a unique identifier for a particular PCB. The authentication application 208 can query the data store 210 with an identifier for a PCB to find a verified digital signature corresponding to the PCB. While the data store 210 is depicted as being part of the server computing device 202, it is understood that the data store 212 may be located on a computing device other than the server computing device 202 (e.g., a cloud computing device).

The computing system 200 further comprises a client computing device 214, as well as the PCB 102 and the computing module 116 as described above in FIG. 1. In an example, the client computing device may be a desktop computing device, a mobile computing device, a laptop computing device, etc. In general, the client computing device 214 can be configured to receive an indication from the server computing device 202 as to whether the PCB 102 is authentic. As discussed previously, the computing module 116 may be placed on the PCB 102, or it may be external to the PCB 102. In a particular embodiment, the computing module 116 may be integrated into the client computing device 214. The server computing device 202 is in network communication with the client computing device 214 by way of a network 250 (e.g., Internet, intranet, etc.). In embodiments where the computing module 116 is separate from the client computing device 214, the server computing device 202 may also be in network communication with the computing module 116 by way of the network 250.

Exemplary operation of the computing system 200 is now set forth. It is contemplated that, at a time when the authenticity of the PCB 102 is known (e.g., shortly after manufacture, after the PCB 102 has been tested, etc.), a verified digital signature for the PCB 102 is generated as described above and stored in the data store 210 along with an identifier for the PCB 102. Subsequent to generating and storing the verified digital signature, it is further contemplated that the computing module 116 has generated a test digital signature as described above.

The server computing device 202 receives the test digital signature and an identifier for the PCB 102 from the computing module 116 by way of the network 250. Responsive to receiving the test digital signature and the identifier for the PCB 102, the authentication application 208 executes a search over the data store 210 comprising the plurality of verified digital signatures 212 based on the identifier for the PCB 102 to generate search results. The search results can comprise the verified digital signature for the PCB 102.

Responsive to executing the search, the authentication application 208 performs a comparison between the test digital signature and the verified digital signature. In an embodiment, the test digital signature and the verified digital signature are bit strings of equal length, and the comparison comprises comparing a first bit at a first position in the test digital signature to a second bit at the first position in the verified digital signature. Another method of comparison can be to XOR the test and verified digital signatures to ensure that the result is all zeros, mostly zeros, etc. There are other approaches for comparing signatures that are also contemplated. The authentication application 208 repeats the comparison for every bit in the test digital signature and verified digital signature. Based on the comparison, the authentication application 208 can output an indication as to whether the test digital signature conforms to the verified digital signature. For instance, when the bits in the test digital signature and the verified digital signature are identical (or within a certain similarity threshold), the authentication application 208 can output an indication to the client computing device that the PCB 102 is authenticated. In an embodiment, the threshold similarity can be a percentage of bits that are identical between the test digital signature and the verified digital signature. For example, the threshold similarity can range from 95 to 99.99% identical bits, 97 to 99.9% identical bits, or 99 to 99.5% identical bits.

Figure 3:
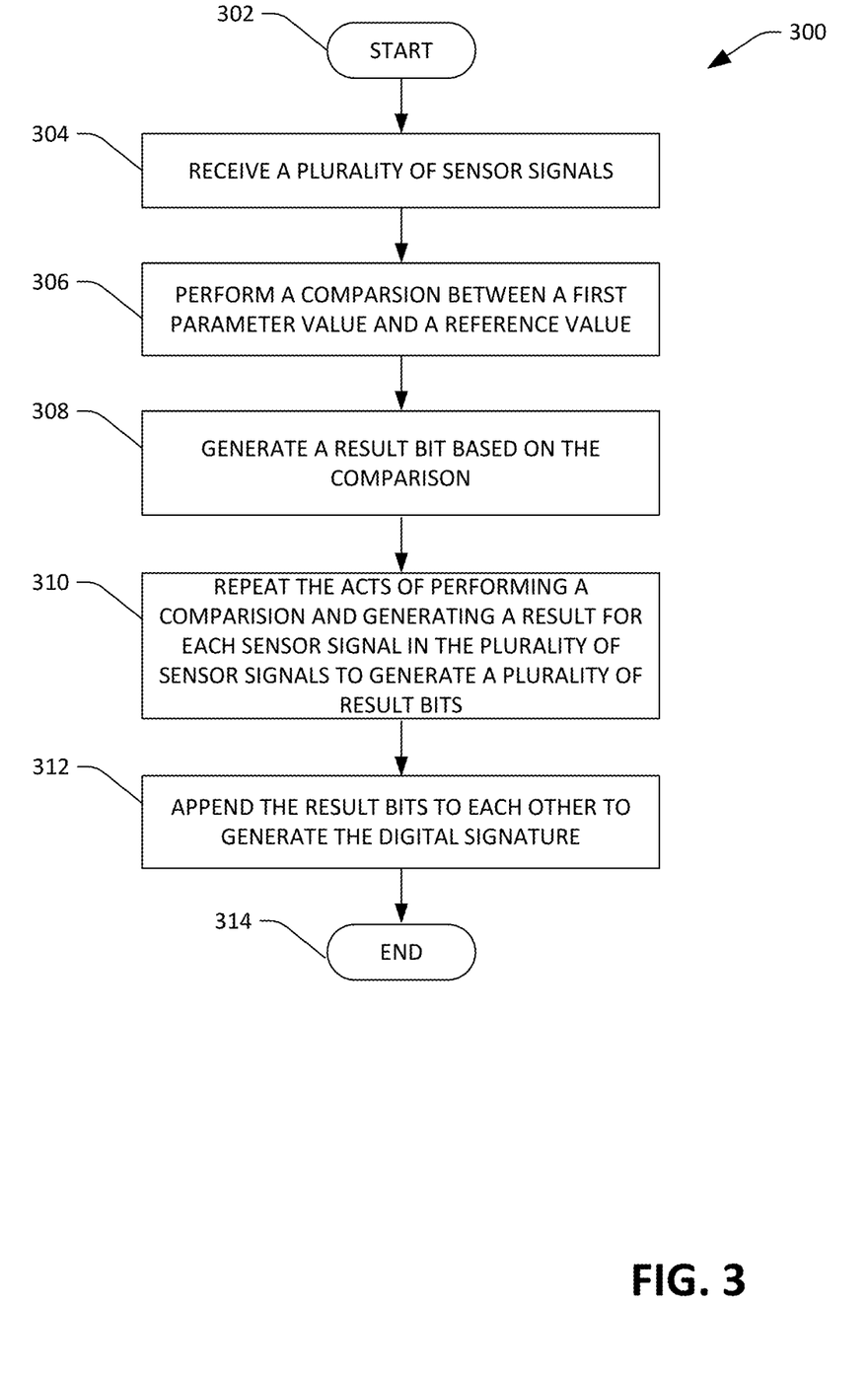
FIG. 3 is an exemplary methodology for generating a digital signature for a PCB.

Turning now to FIG. 3, a methodology 300 that facilitates generating a digital signature for a PCB is illustrated. The methodology 300 begins at 302, and at 304 a computing module receives a plurality of sensor signals from at least one sensor, where the sensor signal is indicative of at least one electrical characteristic of at least one trace and/or at least one component in the PCB when a source signal (with a known waveform and having a known frequency) is applied to the at least one trace and/or the at least one electrical component. A value for at least one parameter in each sensor signal can be ascertained—exemplary parameters include a rising and falling skew of the sensor signal, maximum voltage of the sensor signal, minimum voltage of the sensor signal, etc.

At 306, the parameter value is compared with a reference value for the parameter. The reference value may be a predefined value that is based upon sensor signals observed for other PCBs that have the same design as the PCB (where the sensor signals are obtained when a source signal having the same waveform and known frequency as the source signal referenced above is applied to componentry of the other PCBs). At 308, based on the comparison, the computing module outputs a result bit (e.g., a '1' bit or a '0' bit). For example, the computing module can output a '1' bit when the parameter value is greater than or equal to the reference parameter value and a '0' bit otherwise. At 310, the acts of performing a comparison and generating a result bit are repeated for several parameter values of the at least one sensor signal, thereby creating a sequence of bits. At 312, the computing module generates a digital signature based upon the sequence of bits. In an example, the sequence of bits can be the digital signature. In another example, processing can be performed on the sequence of bits to generate the digital signature for the PCB.

Figure 4:
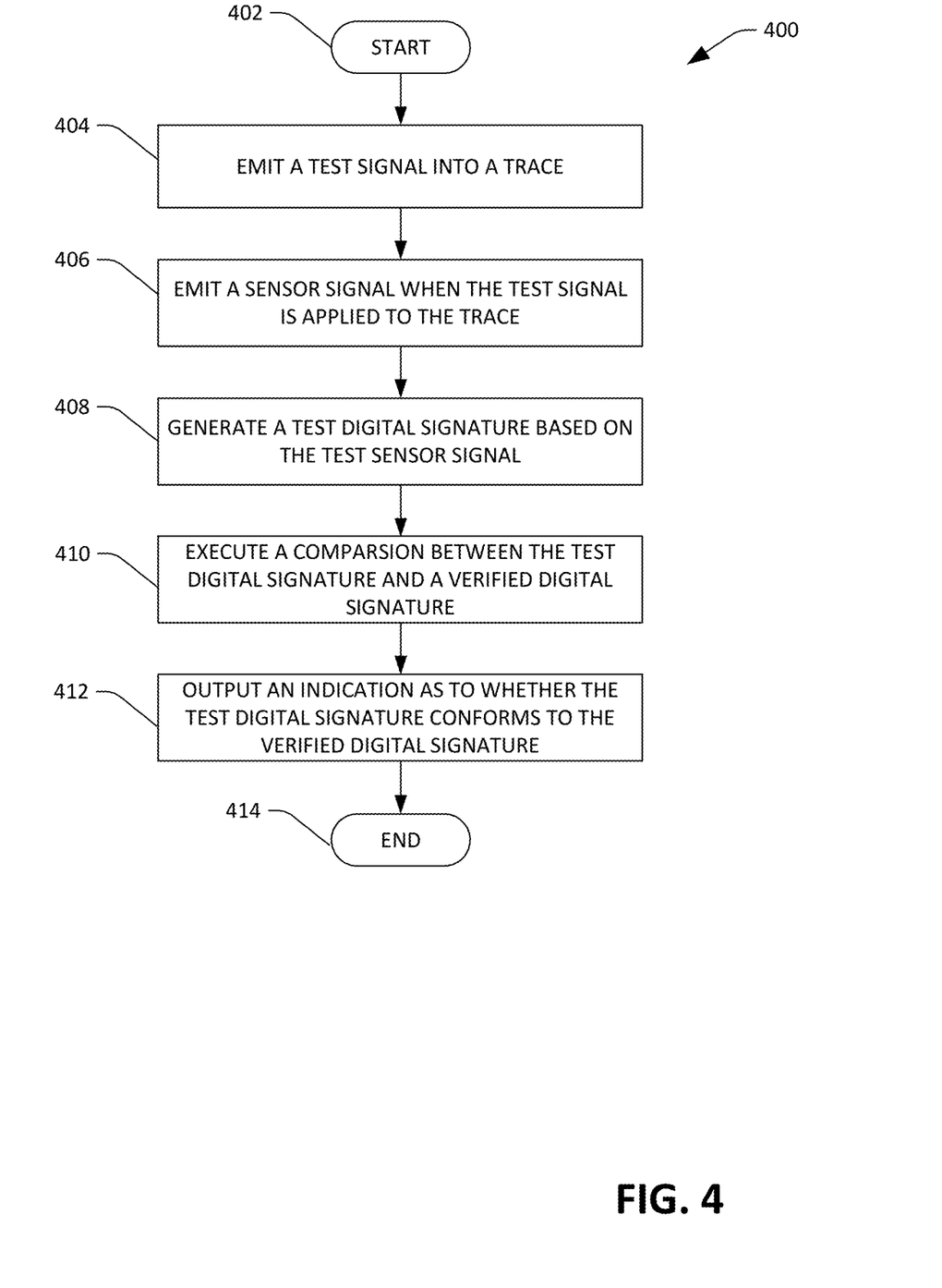
FIG. 4 is an exemplary methodology for authenticating a PCB based on a digital signature.

Referring now to FIG. 4, a methodology 400 executed by a computing module that authenticates a PCB is illustrated. The methodology 400 begins at 402, and at 404 a signal source electrically coupled (directly or indirectly) to a first end of a trace emits a test signal at a known frequency and waveform (and voltage). At 406, a sensor coupled to the trace emits a sensor signal when the test signal is applied to the trace. The sensor signal is indicative of an electrical parameter of the trace. At 408, the computing module generates a test digital signature based on the sensor signal. At 410, the computing module executes a comparison between the test digital signature and a verified digital signature for the PCB. At 412, based on the comparison, the computing module outputs an indication as to whether the test digital signature conforms to the verified digital signature (i.e., whether the PCB is authentic). The test digital signature may conform to the verified digital signature when a certain percentage of bits of the digital signature are identical to bits in the verified digital signature. While the methodology 400 has been described with respect to traces, it is to be understood that the methodology can be adapted to generate the test digital signature based upon measurements of one or more electrical components on the PCB. For example, the sensor can be coupled to terminals of a resistor, and resistance of the resistor can be measured and used in connection with generating the digital signature. The methodology 400 concludes at 414.

Figure 5:
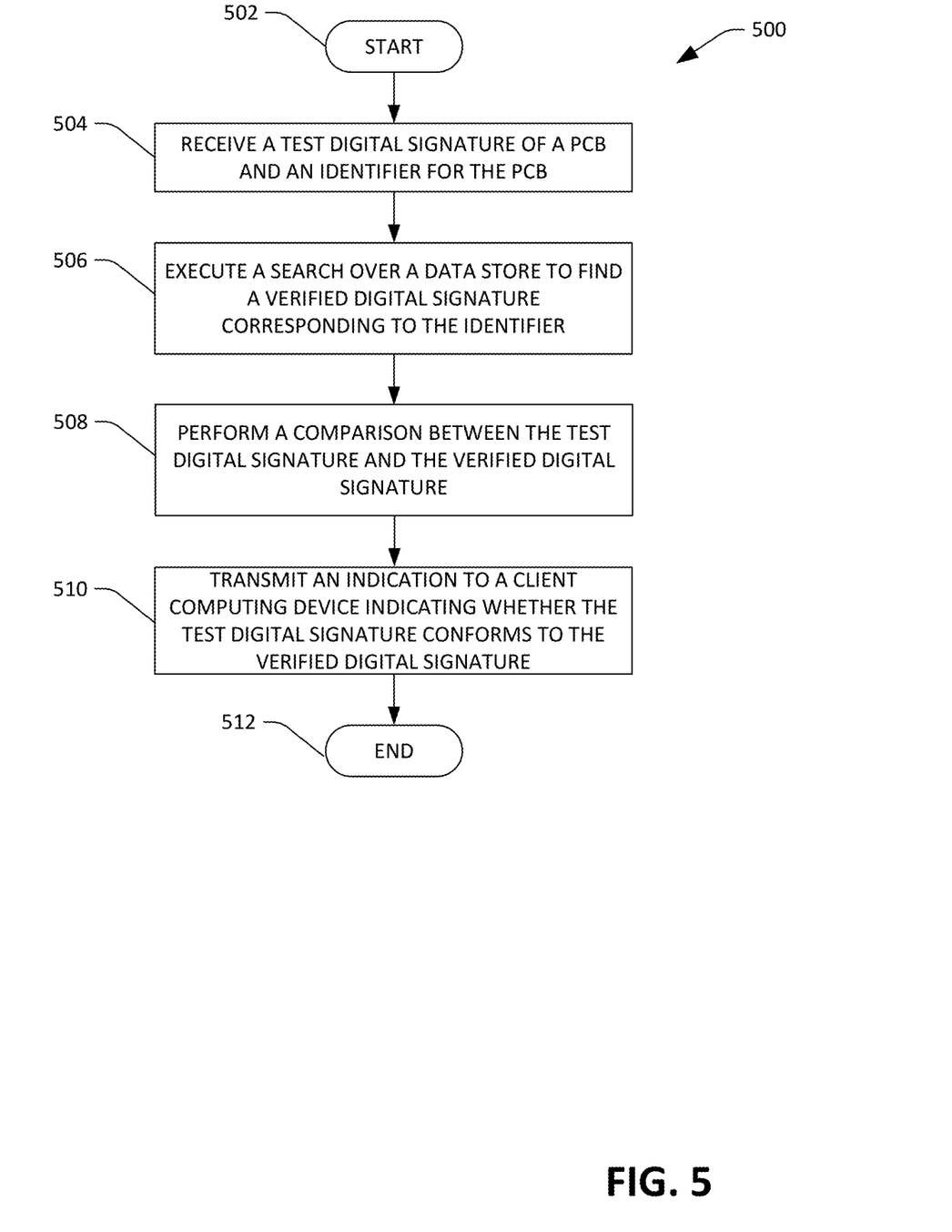
FIG. 5 is an exemplary methodology executed at a server computing device for authenticating a PCB.

Turning now to FIG. 5, a methodology 500 executed by a server computing device that facilitates outputting an indication as to whether a PCB is authentic based on a digital signature is illustrated. The methodology 500 begins at 502, and at 504 the server computing device receives a test digital signature corresponding to a PCB and an identifier for the PCB. At 506, responsive to receiving the test digital signature and the identifier for the PCB, the server computing device executes a search over a data store comprising a plurality of verified digital signatures for a plurality of PCBs to generate search results. The search is based on the identifier for the PCB and the search results comprise a verified digital signature corresponding to the PCB identified by the identifier. At 508, responsive to executing the search to generate search results, the server computing device performs a comparison between the test digital signature and the verified digital signature. At 510, responsive to performing the comparison, the server computing device transmits an indication to the client device indicating whether the test digital signature conforms to the verified digital signature. The methodology 500 concludes at 512.

Figure 6:
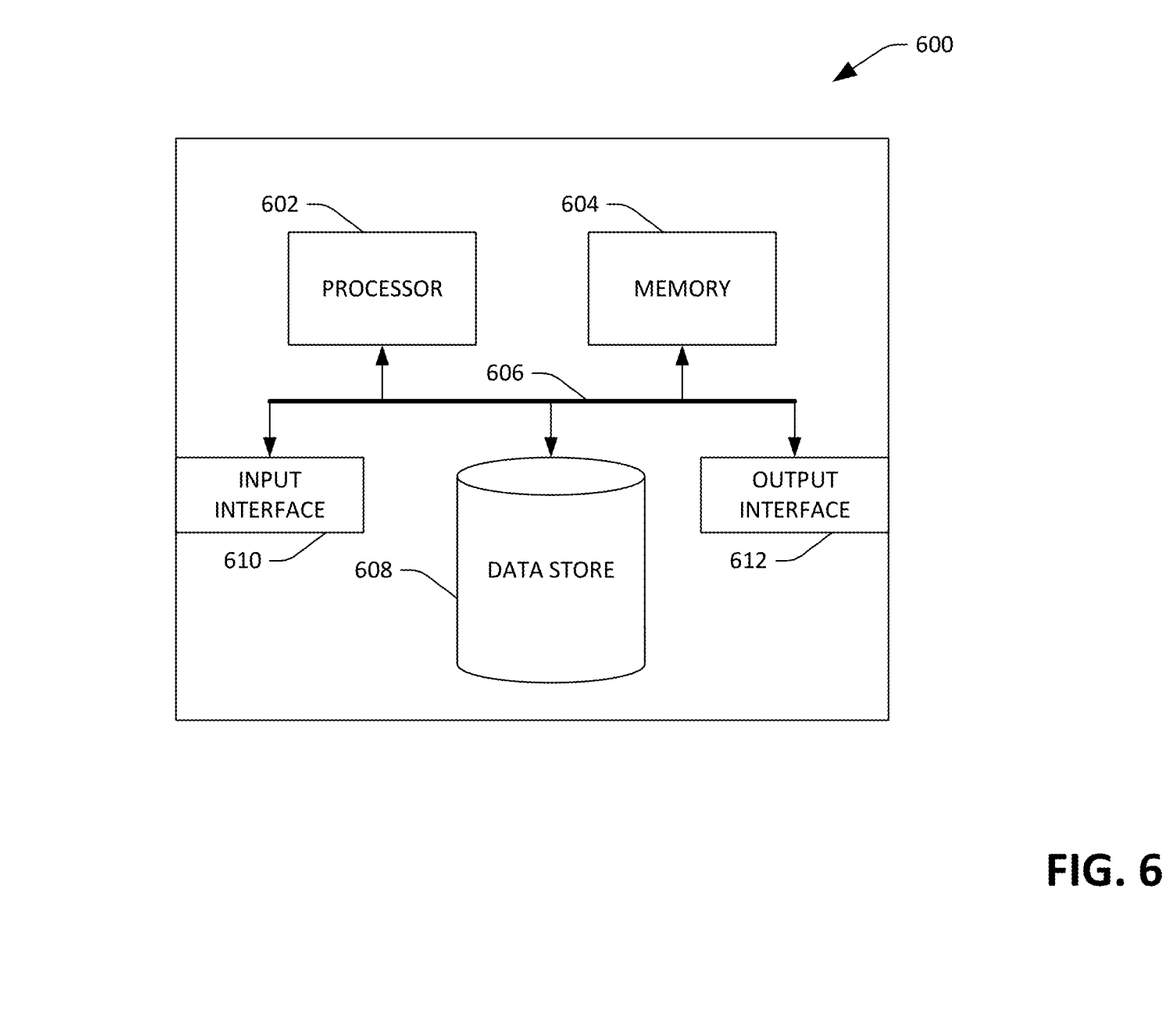
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be used in a system that facilitates authenticating PCBs using digital signatures based on waveforms propagated through wire traces. By way of another example, the computing device 600 can be used in a system that facilitates authenticating PCBs using digital signatures based on waveforms propagated through discrete electrical components, such as a resistor or capacitor. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store digital signatures, testing information, etc.

The computing device 600 additionally includes a data store 608 that is accessible by the processor 602 by way of the system bus 606. The data store 608 may include executable instructions, digital signatures, testing information, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

EXAMPLES

The examples disclosed below further describe the technology discussed herein. The examples also illustrate useful methodology for practicing the technology. The examples do not limit the claims.

The technologies and methodologies described herein were applied using six groups of electrical components: 0.01 µF capacitors, 0.1 µF capacitors, 10 µF capacitors, 1 kΩ resistors, 10 kΩ resistors, and 100 kΩ resistors. Each group of electrical components included 99 total electrical components (e.g., 99 0.01 µF capacitors, 99 0.1 µF capacitors, etc.). Furthermore, electrical components for a given group were taken from three different manufacturers such that a given group was comprised of 33 electrical components from manufacturer 1, 33 electrical components for manufacturer 2, and 33 electrical components for manufacturer. For example, the group containing the 0.01 µF capacitors comprised 33 0.01 µF capacitors from manufacturer 1, 33 0.01 µF capacitors from manufacturer 2, and 33 33 0.01 µF capacitors from manufacturer 3.

Figure 7:
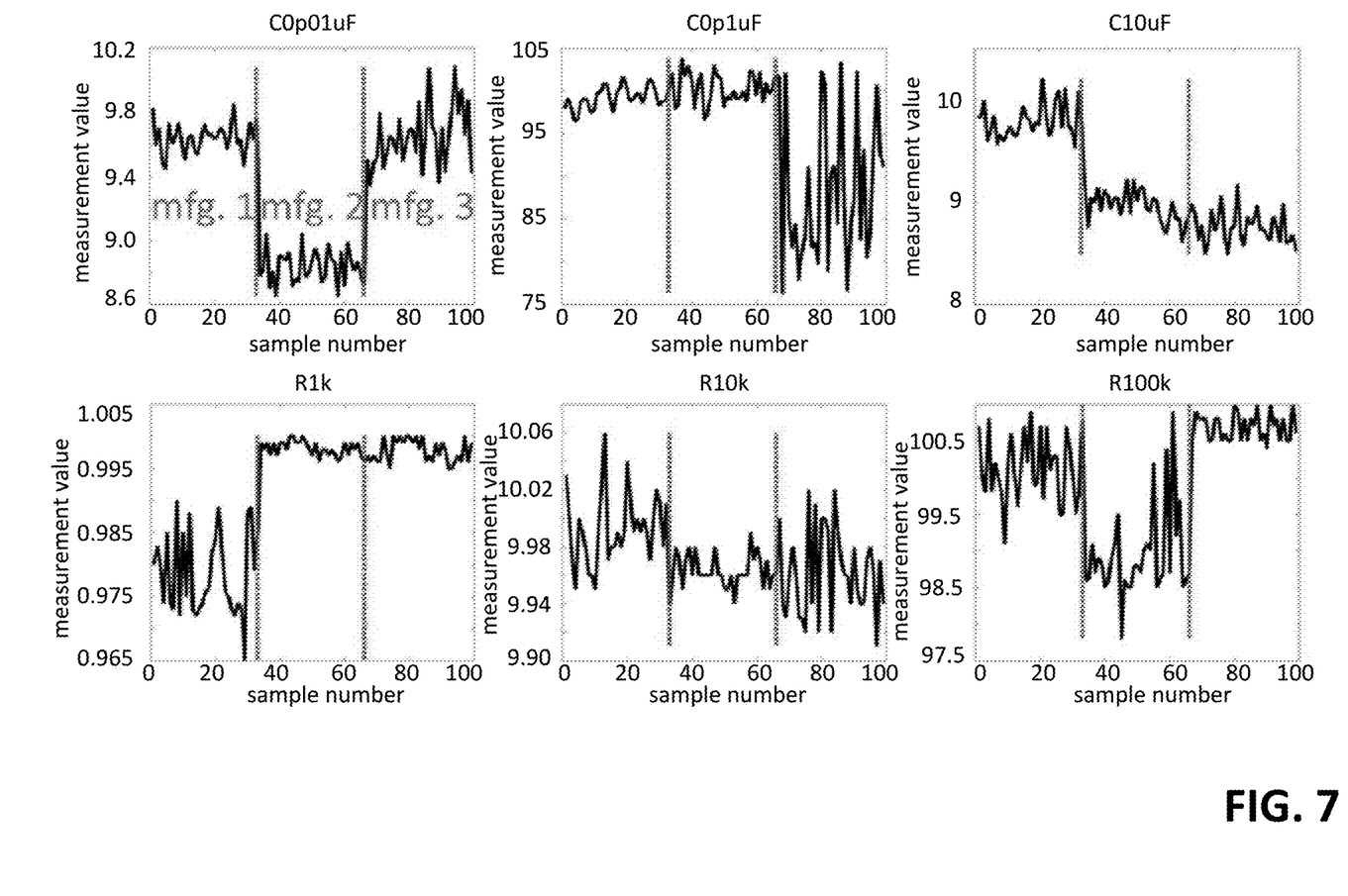
FIG. 7 shows resistance and capacitance measurements for a variety of resistors and capacitors, where the measurements are suitable for use when generating a digital signature for a PCB.

Measurements of the capacitance for the capacitors and resistance for the resistors were then conducted, the results of which are shown in FIG. 7. The measurements were conducted such that the first 33 measurements corresponded to electrical components from manufacturer 1, the second 33 measurements corresponded to electrical components from manufacturer 2, and the third 33 measurements corresponded to electrical components from manufacturer 3. Clear, systematic variations were observed across manufacturers. For instance, for the 0.01 µF capacitor group (labeled c0p01uF in FIG. 7), capacitance measurements of capacitors from manufacturers 1 and 3 were noticeably higher than capacitance measurements of capacitors from manufacturer 2. Thus, different manufacturers impart bias into digital signatures generated from electrical components.

Figure 8:
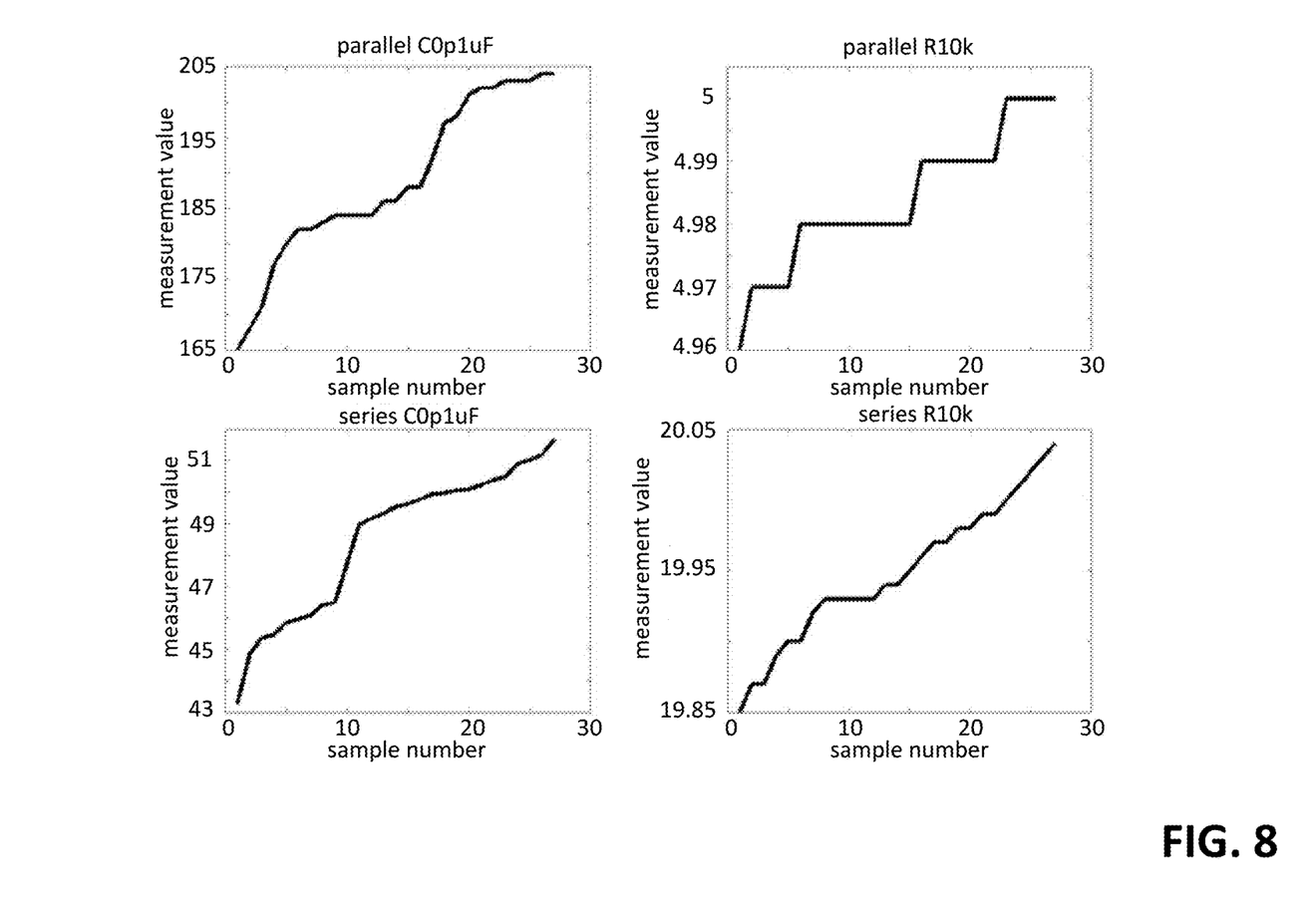
FIG. 8 illustrates resistance and capacitance measurements for a variety of resistors and capacitors in series and in parallel, where the measurements are suitable for use when generating a digital signature for a PCB.

Additionally, certain electrical components were combined in series or parallel to form four additional groups: parallel 0.1 µF capacitors, parallel 10 kΩ resistors, series 0.1 µF capacitors, and series 10 kΩ resistors. Measurements of the capacitance/resistance of the various groups were taken. The results of the measurements are shown in FIG. 8. As seen in the FIG. 8, both parallel and series combinations are monotonically increasing, thus imparting bias into digital signatures generated from electrical component in series and/or parallel configuration.

Each of the ten groups (the 6 individual component groups and the 4 series/parallel groups) was divided into two sets of equal size. Then, each measurement in the first set was compared to each measurement of the second set, outputting a '1' bit if the measurement from the first set is greater than the measurements from the second set and '0' otherwise. Bias (i.e., the ratio of '1' bits to '0' bits) for each of the groups was calculated according to equation I.

$$\text{Bias} = \frac{\text{sum of bits of signature}}{\text{length(signature)}} \qquad (I)$$

A mean and a median for each of the ten groups was calculated. Then, for each of the ten groups, a precursor digital signature was generated by comparing each measurement in the group to the mean or median of the group. A '1' bit was outputted if the value of the measurement was greater than the mean or median. A '0' bit was outputted if the value of the measurement was less than or equal to the median or the median. The bits for each measurement were concatenated to form a precursor digital signature. To form a digital signature for an electrical component in a given group, the precursor digital signatures for that group were separated into 2 sets. Each precursor digital signature from the first set was XORed with each element from the second set to generate a digital signature. The signatures obtained for the capacitors and resistors were 2401 bits long. The signatures for the series and parallel combinations were 169 bits long.

In order to further reduce bias, the order of the measurements in each group was permuted prior to forming the digital signatures. This helped to reduce bias resulting from systematic variations between manufacturers by randomly distributing the different manufacturers amongst the two sets.

TABLE 1

|  | Original | Permuted Measurements, Mean Normalized | Permuted Measurements, Median Normalized |
| --- | --- | --- | --- |
| 0.01 µF | 0.49 | 0.46 | 0.53 |
| 0.1 µF | 0.67 | 0.40 | 0.51 |
| 10 µF | 0.95 | 0.47 | 0.50 |
| 1 kΩ | 0.20 | 0.45 | 0.48 |
| 10 kΩ | 0.66 | 0.49 | 0.49 |
| 100 kΩ | 0.29 | 0.49 | 0.50 |
| Parallel 0.1 µF | 0 | 0.49 | 0.57 |
| Parallel 10 kΩ | 0 | 0.60 | 0.60 |
| Series 0.1 µF | 0 | 0.47 | 0.50 |
| Series 10 kΩ | 0 | 0.50 | 0.52 |

Results of the original, permuted, and non-permuted biases are shown in Table 1. Permuting the measurements resulted in a bias near the target value of 0.5.

The digital signatures for each group were then concatenated to each other to form a 123,201 bit long signature.

TABLE 2

|  | Mean Normalized | Median Normalized |
| --- | --- | --- |
| Bias | 0.4936 | 0.4973 |
| Entropy | 0.9999 | 1.0000 |
| Minimum Entropy | 0.9816 | 0.9923 |

Table 2 shows bias, entropy, and minimum entropy measurements of the 123,201 bit long signature. The results showed essentially no bias, full entropy, and almost full minimum entropy.

Figure 9:
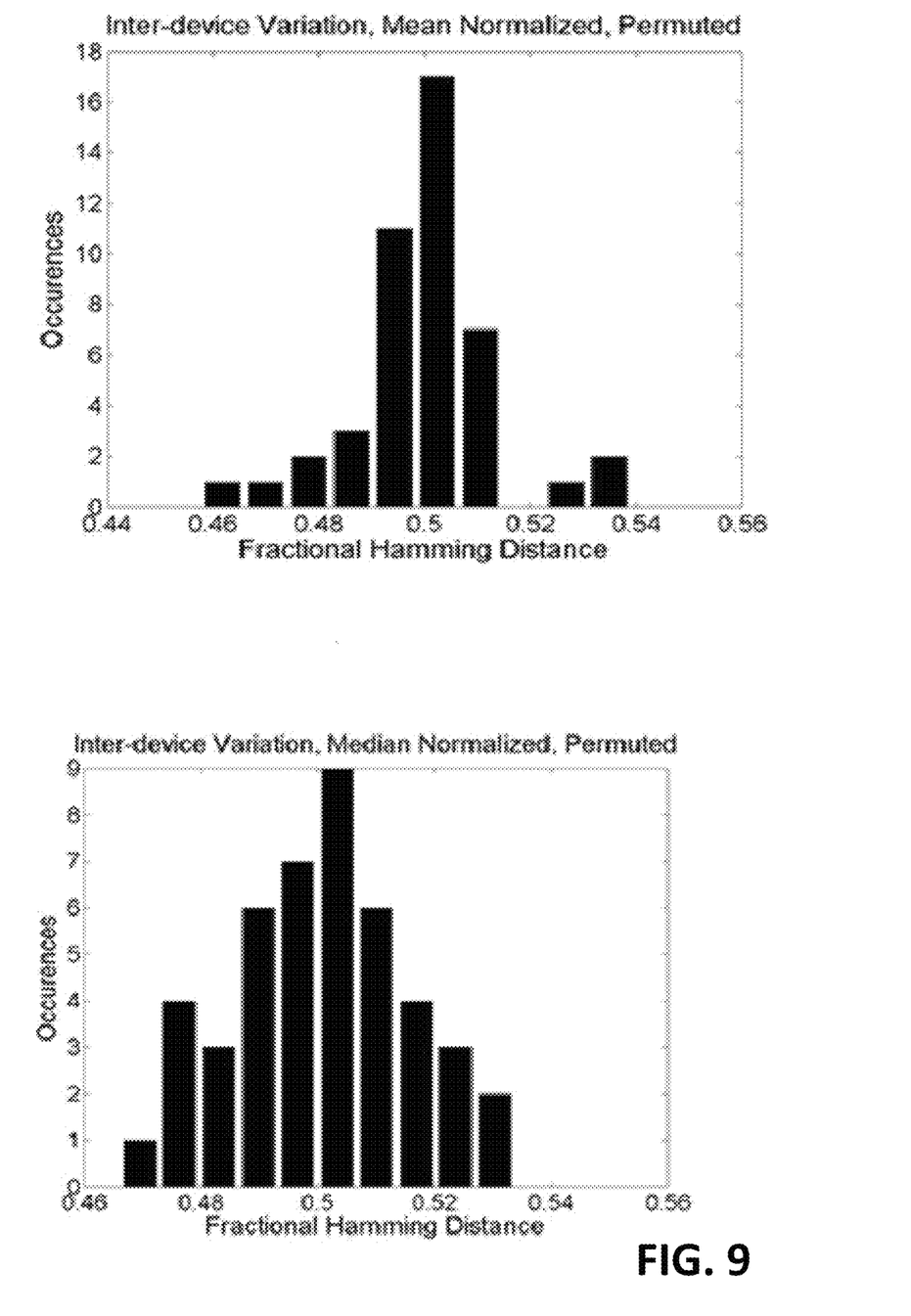
FIG. 9 is a bar chart depicting fractional hamming distances between devices, where the distances are suitable for use when generating a digital signature for a PCB.

In order to simulate a PCB, electrical components from each of the ten groups were selected. FIG. 9 show the inter-device variation between the mean normalized and median normalized digital signatures for the simulated PCBs. Inter-device variation (IDV) (also called fractional hamming distance) between a digital signature for PCB $B_1$ and a digital signature for PCB $B_2$ was calculated according to equation (II):

$$IDV(B_1, B_2) = \frac{\text{(Number of differing bits between } B_1 \text{ and } B_2)}{\text{length(signature)}} \quad (II)$$

TABLE 3

|  | Bias | Inter-device Variation | Entropy | Min. Entropy |
|---|---|---|---|---|
| Mean | 0.4939 | 0.4998 | 0.9961 | 0.9276 |
| Median | 0.4838 | 0.5005 | 0.9996 | 0.9688 |
| Std. Dev. | 0.0382 | 0.0139 | 0.0060 | 0.0729 |
| Min. | 0.4454 | 0.4579 | 0.9816 | 0.7869 |
| Max. | 0.5796 | 0.5390 | 1.0000 | 0.9925 |

Table 3 shows the bias, inter-device variation, entropy, and minimum entropy for mean normalized simulated PCBs. Inter-device variation should be high (ideally 50% on average) so that two separate PCBs have a maximally decorrelated digital signature. The digital signatures generated for Table 3 were 961 bits long.

TABLE 4

|  | Bias | Inter-device Variation | Entropy | Min. Entropy |
|---|---|---|---|---|
| Mean | 0.4943 | 0.5003 | 0.9988 | 0.9510 |
| Median | 0.4912 | 0.5000 | 0.9993 | 0.9556 |
| Std. Dev. | 0.0208 | 0.0139 | 0.0013 | 0.0318 |
| Min. | 0.4609 | 0.4766 | 0.9956 | 0.8915 |
| Max. | 0.5234 | 0.5352 | 1 | 1 |

Table 4 shows the bias, inter-device variation, entropy, and minimum entropy for the median normalized PCBs. Inter-device variation should be high (ideally 50% on average) so that two separate PCBs have a maximally decorrelated digital signature. The digital signatures generated for Table 4 were 961 bits long.

Next, digital signatures were generated for the electrical components on a manufacturer basis using the techniques described above.

TABLE 5

| Capacitors | Bias | Entropy | Min. Entropy | Resistors | Bias | Entropy | Min. Entropy |
|---|---|---|---|---|---|---|---|
| 0.01 µF (manuf. 1) | 0.52 | 0.999 | 0.96 | 1 kΩ (manuf. 1) | 0.50 | 1 | 1 |
| 0.01 µF (manuf. 2) | 0.50 | 1 | 1 | 1 kΩ (manuf. 2) | 0.52 | 0.999 | 0.96 |
| 0.01 µF (manuf. 3) | 0.51 | 0.999 | 0.98 | 1 kΩ (manuf. 3) | 0.50 | 1 | 1 |
| 0.1 µF (manuf. 1) | 0.55 | 0.994 | 0.87 | 10 kΩ (manuf. 1) | 0.50 | 1 | 1 |
| 0.1 µF (manuf. 2) | 0.50 | 1 | 1 | 10 kΩ (manuf. 2) | 0.47 | 0.997 | 0.91 |
| 0.1 µF (manuf. 3) | 0.52 | 0.998 | 0.93 | 10 kΩ (manuf. 3) | 0.53 | 0.997 | 0.91 |
| 10 µF (manuf. 1) | 0.47 | 0.997 | 0.91 | 100 kΩ (manuf. 1) | 0.50 | 1 | 1 |
| 10 µF (manuf. 2) | 0.50 | 1 | 1 | 100 kΩ (manuf. 2) | 0.46 | 0.996 | 0.89 |
| 10 µF (manuf. 3) | 0.50 | 1 | 1 | 100 kΩ (manuf. 3) | 0.52 | 0.999 | 0.96 |

Table 5 shows the bias, entropy, and minimum entropy for each of the three manufacturers of the capacitors and resistors using mean normalization. The digital signature for each component was 256 bits long.

TABLE 6

| Capacitors | Bias | Entropy | Min. Entropy | Resistors | Bias | Entropy | Min. Entropy |
|---|---|---|---|---|---|---|---|
| 0.01 µF (manuf. 1) | 0.50 | 1 | 1 | 1 kΩ (manuf. 1) | 0.55 | 0.9937 | 0.8707 |
| 0.01 µF (manuf. 2) | 0.50 | 1 | 1 | 1 kΩ (manuf. 2) | 0.52 | 0.9993 | 0.9556 |
| 0.01 µF (manuf. 3) | 0.52 | 0.9993 | 0.9556 | 1 kΩ (manuf. 3) | 0.50 | 1 | 1 |
| 0.1 µF (manuf. 1) | 0.57 | 0.9857 | 0.8102 | 10 kΩ (manuf. 1) | 0.48 | 0.9984 | 0.9939 |
| 0.1 µF (manuf. 2) | 0.50 | 1 | 1 | 10 kΩ (manuf. 2) | 0.45 | 0.9937 | 0.8707 |
| 0.1 µF (manuf. 3) | 0.53 | 0.9972 | 0.9125 | 10 kΩ (manuf. 3) | 0.48 | 0.9993 | 0.9556 |
| 10 µF (manuf. 1) | 0.55 | 0.9937 | 0.8707 | 100 kΩ (manuf. 1) | 0.52 | 0.9984 | 0.9339 |
| 10 µF (manuf. 2) | 0.50 | 1 | 1 | 100 kΩ (manuf. 2) | 0.55 | 0.9937 | 0.8707 |
| 10 µF (manuf. 3) | 0.51 | 0.9998 | 0.9776 | 100 kΩ (manuf. 3) | 0.50 | 1 | 1 |

Table 6 shows the bias, entropy, and minimum entropy for each of the three manufacturers of the capacitors and resistors using median normalization. The digital signature for each component was 256 bits long.

Table 7 shows the hamming distance (Inter-device variation) values for different trace types and shapes digital signatures and their corresponding measurement attributes.

TABLE 7

| Trace | Fall Time | Levels | Overshoot | Rise Time | Undershoot | Skew |
|---|---|---|---|---|---|---|
| AV1 | 0.35417 | 0.5125 | 0.04305 | 0.33333 | 0.07777 | 0.32083 |
| AV2 | 0.33333 | 0.47361 | 0.03333 | 0.35417 | 0.07638 | 0.30972 |
| LBRD1 | 0.22778 | 0.16389 | 0.02361 | 0.30139 | 0.05694 | 0.19722 |
| LBRD2 | 0.21389 | 0.19306 | 0.01111 | 0.25972 | 0.04861 | 0.2 |
| MP1 | 0.36389 | 0.49167 | 0.04722 | 0.35139 | 0.09861 | 0.32917 |
| MP2 | 0.30694 | 0.50556 | 0.05833 | 0.32778 | 0.10278 | 0.38472 |
| S1 | 0.35556 | 0.50417 | 0.01944 | 0.39167 | 0.07083 | 0.39583 |
| S2 | 0.34444 | 0.5 | 0.03194 | 0.375 | 0.05416 | 0.28889 |
| SPF1 | 0.19861 | 0.25972 | 0.01805 | 0.22778 | 0.04166 | 0.10556 |
| SPF2 | 0.23611 | 0.275 | 0.0375 | 0.21111 | 0.03472 | 0.11667 |

TABLE 7-continued

| Trace | Fall Time | Levels | Overshoot | Rise Time | Undershoot | Skew |
|---|---|---|---|---|---|---|
| SPV1 | 0.02361 | 0.23611 | 0.07083 | 0.01388 | 0.025 | 0.09167 |
| SPV2 | 0.02916 | 0.34861 | 0.06805 | 0.01388 | 0.04027 | 0.05 |
| W1 | 0.33889 | 0.49444 | 0.02368 | 0.32361 | 0.09722 | 0.375 |
| W2 | 0.325 | 0.46667 | 0.025 | 0.33472 | 0.07777 | 0.38056 |
| ZZSQ1 | 0.34583 | 0.4875 | 0.04166 | 0.38472 | 0.08472 | 0.25278 |
| ZZSQ2 | 0.325 | 0.49583 | 0.04305 | 0.36667 | 0.07361 | 0.18889 |

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing module comprising a hardware processor that is configured to perform acts comprising:
    generating, by the hardware processor, a digital signature for a printed circuit board (PCB) that uniquely identifies the PCB, wherein the digital signature is based upon a sensor signal generated by a sensor that is electrically coupled to at least one of a trace of the PCB or an electrical component of the PCB, wherein the sensor generates the sensor signal as an electrical signal having a predefined waveform is propagated through the trace, wherein the trace connects a first electrical component that is mounted on the PCB to a second electrical component that is mounted on the PCB separately from the first electrical component, wherein the sensor signal is indicative of electrical characteristics of the trace;
    determining, by the hardware processor, that the PCB is authentic and is free of tampering based upon the digital signature, wherein determining that the PCB is authentic and is free of tampering comprises:
        comparing the digital signature with a verified digital signature for the PCB, wherein the verified digital signature was previously generated for the PCB; and
        determining that the PCB is authentic and free of tampering based upon the comparison; and
    outputting, by the hardware processor, an indication that the PCB is authentic and is free of tampering responsive to determining that the PCB is authentic and is free of tampering.

2. The computing module of claim 1, wherein the PCB comprises an integrated circuit (IC) that includes a physical unclonable function (PUF), wherein the digital signature for the PCB is based upon output of the PUF.

3. The computing module of claim 1, wherein the computing module is located on an integrated circuit (IC) of the PCB.

4. The computing module of claim 1, wherein determining that the PCB is authentic and free of tampering comprises determining that the digital signature is equivalent to the verified digital signature.

5. The computing module of claim 1, wherein the electrical signal is emitted by a signal source, and further wherein the electrical signal additionally has a predefined frequency.

6. The computing module of claim 1, wherein the electrical component is one of a resistor or a capacitor.

7. A method executed by a computing module, the method comprising:
    generating a digital signature for a printed circuit board (PCB) that uniquely identifies the PCB, wherein the digital signature is based upon a sensor signal generated by a sensor that is electrically coupled to at least one of a trace of the PCB or an electrical component of the PCB, wherein the sensor signal is based upon an electrical signal having a predefined waveform that is propagating through the trace of the PCB, wherein the trace connects a first electrical component that is mounted on the PCB to a second electrical component that is mounted on the PCB separately from the first electrical component, wherein the sensor signal is indicative of electrical characteristics of the trace;

determining that the PCB is authentic and is free of tampering based upon the digital signature, wherein determining that the PCB is authentic and is free of tampering comprises:

comparing the digital signature with a verified digital signature for the PCB, wherein the verified digital signature was previously generated for the PCB; and determining that the PCB is authentic and free of tampering based upon the comparison; and outputting an indication that the PCB is authentic and is free of tampering responsive to determining that the PCB is authentic and is free of tampering.

8. The method of claim 7, wherein the PCB comprises an integrated circuit (IC) that includes a physical unclonable function (PUF), wherein the digital signature for the PCB is based upon output of the PUF.

9. The method of claim 7, wherein the computing module is located on an integrated circuit (IC) of the PCB.

10. The method of claim 7, wherein determining that the PCB is authentic and free of tampering comprises determining that the digital signature is equivalent to the verified digital signature.

11. The method of claim 7, wherein the electrical signal is emitted by a signal source, and further wherein the electrical signal additionally has a predefined frequency.

12. The method of claim 7, wherein the electrical component is one of a resistor or a capacitor.

13. A computer-readable storage medium comprising instructions that, when executed by a processor, cause the processor to perform acts comprising:

generating a digital signature for a printed circuit board (PCB) that uniquely identifies the PCB, wherein the digital signature is based upon a sensor signal generated by a sensor that is electrically coupled to at least one of a trace of the PCB or an electrical component of the PCB, wherein the sensor signal is based upon an electrical signal having a predefined waveform that is propagating through the trace of the PCB, wherein the trace connects a first electrical component that is mounted on the PCB to a second electrical component that is mounted on the PCB separately from the first electrical component, wherein the sensor signal is indicative of electrical characteristics of the trace;

determining that the PCB is authentic and is free of tampering based upon the digital signature, wherein determining that the PCB is authentic and is free of tampering comprises:

comparing the digital signature with a verified digital signature for the PCB, wherein the verified digital signature was previously generated for the PCB; and determining that the PCB is authentic and free of tampering based upon the comparison; and outputting an indication that the PCB is authentic and is free of tampering responsive to determining that the PCB is authentic and is free of tampering.

14. The computer-readable storage medium of claim 13, wherein the PCB comprises an integrated circuit (IC) that includes a physical unclonable function (PUF), wherein the digital signature for the PCB is based upon output of the PUF.

15. The computer-readable storage medium of claim 13, wherein the computer-readable storage medium is located on an integrated circuit (IC) of the PCB.

16. The computer-readable storage medium of claim 13, wherein determining that the PCB is authentic and free of tampering comprises determining that the digital signature is equivalent to the verified digital signature.

17. The computing module of claim 1, wherein the digital signature is generated based upon at least one of:

an overshoot of the electrical signal that is propagating through the trace;

an undershoot of the electrical signal that is propagating through the trace;

a rise time with respect to the electrical signal that is propagating through the trace;

a fall time with respect to the electrical signal that is propagating through the trace; or a skew with respect to the signal that is propagating through the trace.

* * * * *